United States Patent [19]

Kalsi

[11] Patent Number: 4,489,918
[45] Date of Patent: Dec. 25, 1984

[54] NONFLOATING SEAT FOR EXPANDING GATE VALVES

[76] Inventor: Manmohan S. Kalsi, 14307 Chevy Chase, Houston, Tex. 77077

[21] Appl. No.: 467,889

[22] Filed: Feb. 18, 1983

[51] Int. Cl.³ .............................................. F16K 3/00
[52] U.S. Cl. .................................. 251/328; 251/327; 251/195; 251/167
[58] Field of Search ............... 251/167, 196, 197, 327, 251/328, 195

[56] References Cited

U.S. PATENT DOCUMENTS

| | | | |
|---|---|---|---|
| 2,834,571 | 5/1958 | Hollander | 251/195 |
| 2,985,189 | 5/1961 | Dickinson | 251/328 X |
| 3,006,601 | 10/1961 | Anderson | 251/328 X |
| 3,135,282 | 6/1964 | Volpin | 251/327 X |
| 3,265,440 | 10/1973 | Grove | 251/328 X |
| 3,434,692 | 3/1969 | Tillman | 251/327 X |
| 4,113,233 | 9/1978 | Bond | 251/196 X |
| 4,208,035 | 6/1980 | Alvarez | 251/328 X |
| 4,236,692 | 12/1980 | Williamson | 251/196 X |
| 4,258,743 | 3/1981 | Dare | 251/167 X |

*Primary Examiner*—Harold W. Weakley
*Attorney, Agent, or Firm*—Gunn, Lee & Jackson

[57] ABSTRACT

To prevent pressure induced floating of the interference fitted seats of expanding gate valves, a seat ring body is provided which is press fitted within the upstream seat recess of a valve body. The seat ring body defines a sealing face of circular form which is disposed for sealing engagement with the segment portion of an expanding gate and segment assembly. The seat ring body also defines an axial extension tube extending upstream from the seat ring body with a circular sealing lip defining the outer periphery thereof being in radial sealing engagement with a reduced diameter portion of the seat recess. The radial extension is pressure yieldable to enhance the radial sealing capability thereof and defines a pressure responsive area that is equal to or less than the pressure responsive area of the sealing face.

21 Claims, 4 Drawing Figures

NONFLOATING SEAT FOR EXPANDING GATE VALVES

FIELD OF THE INVENTION

This invention relates generally to gate valves, and more specifically concerns nonfloating seats for parallel expanding gate valves.

BACKGROUND OF THE INVENTION

Parallel, expanding, through-conduit gate valves are widely utilized in high pressure fluid controlling service such as is typically found in the petroleum industry because the sealing capability thereof can be mechanically controlled to accomplish the necessary seat/gate force for efficient metal-to-metal sealing capability. Moreover, the sealing capability of the valve mechanism can be mechanically controlled both in the open and closed positions thereof through external application of linear force on the expanding gate mechanism. Where gear actuators and hand wheels are employed to accomplish opening and closing movement of the valve mechanism, personnel will simply rotate the hand wheel sufficiently to apply an adequate amount of torque which, through the gear train mechanism, applies desired linear force to the valve stem interconnecting the expanding gate mechanism with the valve actuator. Expanding gate mechanisms take a number of different forms but one widely accepted expanding gate mechanism is representative of the prior art shown generally at 10 in FIG. 1. The parallel expanding gate assembly of FIG. 1 consists of two wedge pieces, namely a gate member 12 and a segment member 14, which are held together by means of arched wire springs 16 having curved extremities 18 and 20 in engagement with pin members 22 and 24 positioned at the upper and lower extremities of the gate member. The intermediate portions of the arched spring wires 16 are positioned in engagement with a pin members 26 which are centrally located on opposite sides of the segment member 14. The force developed by the spring wires 16 on the pins on the gate and segment urge the free segment member toward a fully seated relationship with the gate member so that surfaces 28 and 30 of the segment are disposed in intimate seated, fully engaging relation with both of the angulated surfaces 32 and 34 of the gate member. The angulated surfaces 28 and 30 of the segment and 32 and 34 of the gate are in fact planar cam surfaces which control the position of planar sealing faces 36 and 38 formed respectively on the gate and segment members.

The gate member is movable linearly by means of one or more valve stems 40 and 42. Typically, one of the stems 40 functions as a gate actuating stem while the opposite stem 42 functions as a pressure balancing stem. The valve body structure 44 which defines a valve chamber 46 within which the expanding gate assembly is linearly movable also defines internal stop pads 48 and 50 which are engageable respectively by the upper and lower extremities 52 and 54 of the segment as the segment reaches its limits of travel in either direction. The gate and segment members also define circular port openings shown in broken line at 56 and 58 which become aligned with one another and also aligned with circular flow passages 60 and 62 of the valve body when the expanding gate assembly is in the fully opened and sealed position thereof. The valve body is also formed to define opposed seat recesses 64 and 66 within which seat members 68 and 70 are received. In expanding gate valves it is typical for the seat members 68 and 70 to be press fitted within the seat recesses 64 and 66 so as to establish a nonfloating, interference fitted relationship.

In order to close the valve of FIG. 1, which shows the gate and segment assembly in an intermediate position, a downward force is applied to the gate and segment assembly through the valve stem 40. The gate and segment assembly moves downwardly together until such time as the lower extremity 54 of the segment comes into contact with the stop pad 50. At this time, further downward movement of the segment is prevented by the stop pad while the valve stem continues to move downwardly thereby also causing the gate member to be moved downwardly. This further downward movement of the gate member while the segment member is restrained against downward movement by the stop pad causes relative movement of the angulated planar cam surfaces of the gate and segment. Downward movement of the gate member under this condition causes camming reaction to take place between planar surfaces 28 and 32, thus causing the segment member to be moved transversely to the longitudinal axis of the valve stem. When this occurs, angulated surfaces 30 and 34 become separated and the sealing surfaces 36 and 38 of the gate and segment are moved apart (expanded relative to one another) until they firmly contact the respective sealing faces 72 and 74 of the seat member 68 and 70. The seating force of the gate and segment against the seat members can be increased simply by applying sufficient linear force to the valve stem 40 which, through camming activity of the inclined surfaces, develops sufficient expansion force of the gate and segment against the seat members to provide a proper seal and thus obtain efficient shut off. In the closed position, sufficient sealing force can be developed at the face of the upstream seat 68 by wedging the gate and segments tightly against the seats in the closed position to develop an upstream seal.

Under normal operation, when the stem 40 is moved upwardly to open the valve, the gate also begins to move upwardly. The upstream pressure acting on the segment 14, assisted by the urging force of the arched spring wire 16 causes movement of the segment away from the upstream seat 68, thus moving the segment back into the notch of the gate with the inclined surfaces 28 and 30 of the segment in fully seated contact with the intersecting inclined surfaces 32 and 34 of the gate member as shown in FIG. 1. Further upward movement of the gate and segment assembly occurs together with only the downstream sealing surface 36 of the gate dragging against its respective downstream seat 70. In this condition, the segment member 14 is disposed in spaced relation with the upstream seat 68. With only the downstream sealing surface 36 of the gate in contact with the downstream seat 70, the gate and segment assembly can then be moved to the fully open position with relatively little effort at the hand wheel.

VALVE BINDING PROBLEM DUE TO "FLOATING" UPSTREAM SEAT

As mentioned above, the valve seats 68 and 70 are press fitted into their respective seat recesses, resulting in a radial interference pressure and the related friction force that secures the seats in immovable position within the seat recesses. In some applications, however, the upstream fluid pressure present in the recess behind the upstream seat can overcome the frictional force due to the interference fit of the seat, thus forcing the upstream seat to "float out" and become forced by pressure against the upstream sealing surface 38 of the segment. This problem has been especially prevalent when fluids are handled at high pressures and in the larger size valves. The problem is also prevalent in applications where differences in thermal expansion of the seat and body materials result in a loss of radial interference pressure at the operating temperature range of the valve. When the upstream seat 68 "floats out" due to the resultant force developed by pressure acting on the surface area of its back face, the sealing surface 72 of the upstream seat develops an additional frictional drag force on segment surface 38, thus increasing the required operating torque or actuating stem force in excess of that required for normal operation where only downstream seat drag is present. In the case of high pressure valves, the force developed between a floating upstream seat and the segment can be sufficiently large to impede the upward movement of the segment when the actuating stem 40 is being moved upwardly to open the valve. With the upward segment motion being stopped due to the frictional drag of a floating upstream seat, any further upward motion of the valve stem 40 results in an upward movement of the gate member with respect to the segment. This results in camming activity between the inclined surfaces 30 and 34 which are caused to slide relative to one another while the cam surfaces 28 and 32 are moved apart. This activity, of course, causes expansion of the gate and segment assembly, thereby driving the sealing surfaces 36 and 38 apart and in a direction toward the respective seat members. Thus, as more force is applied in an attempt to open the valve (by moving the gate and segment assembly to the upward position), the gate and segment elements begin to expand more and wedge tighter between the seat faces instead of moving the gate and segment assembly upwardly toward the open position. Under this condition, if even greater force is applied to the actuating stem 40 thus attempting to force the gate element toward its open position, the result is not opening movement of the gate and segment assembly but rather the development of additional expansion force of the gate and segment assembly. Such activity frequently causes the gate and segment assembly to become tightly wedged or "locked up" in the closed position, and the valve cannot then be opened without causing galling of the contacting sealing faces of the gate and segment with the respective seats. Usually, special disassembly procedures are required when expanding gate valves have become locked due to floating upstream seats or, in the alternative, abnormally high stem force must then be applied to attempt movement of the expanding gate assembly to its open position. Obviously, when abnormally high stem forces are applied there is a possibility of damaging the valve mechanism. This is a problem that has plaqued parallel expanding gate valves for many years.

THE PRIOR ART

A number of attempts have been made to overcome the floating upstream seat problems of parallel expanding gate valves over the years. Some success has been obtained but, for the most part, success has been accomplished only at the expense of introducing other disadvantages such as increased expense, major valve redesign, other mechanical problems, etc. One attempt to overcome the floating seat problem is evidenced by U.S. Pat. No. 3,823,911 wherein an expanding gate valve incorporates two spacer plates which are inserted between the faces of the upstream and downstream seats. The width of these spacer plates is larger than the width of the gate and segment assembly in its collapsed or contracted position. Thus, the upstream seat is prevented from contacting the upstream sealing surface of the segment when the gate and segment assembly are moved to the collapsed position thereof to facilitate upward movement while opening the valve. Since the upstream seat cannot impose a frictional drag on the sealing surface of the segment, the gate and segment move together in the upward direction when the valve stem is moved upwardly without any tendency for the development of camming sliding activity relative to one another. Thus, no undesirable expansion of the gate and segment occurs when attempting to move the valve mechanism from the closed position to the open position. One of the major limitations of the design set forth in the patent, however, is that a complete redesign of the valve castings is required to accommodate the thick spacer plates necessary to resist the force of the upstream "floating" seat and to keep it in place. Since the inside diameter of the valve body is designed to be as small as possible to minimize the size and thus weight of the body casting and thus also minimize cost, the amount of space inside presently existing valve body designs is logically insufficient to accommodate the thick spacer plates necessary to maintain stresses in the spacers below the yield point thereof. Stresses in the spacer plates that can be fitted in the space available in existing valve body designs for high pressures are typically in excess of about 200,000 PSI—well above the yield strength of most practical materials suitable for typical use such as in oil field service. Thus, an expanding gate valve constructed in accordance with the above patent requires body castings of larger inside diameter as compared to those presently used, resulting in more weight and uneconomical design. This competitive disadvantage has in fact prevented any commercial success of the design shown in the patent.

Another development to overcome the floating seat problem of parallel expanding gate valves is evidenced by U.S. Pat. No. 3,929,316 which teaches utilization of a plastic insert at the back of the seat to prevent pressure from acting on the full area defined by the back surface of the seat. However, this valve improvement relies on a relatively soft insert composed of any one of a number of suitable plastic materials to establish a seal and prevent pressure from acting on the entire back face surface of the seat. This soft seal design is not pressure energized and therefore it does not work reliably in keeping the high upstream pressure from leaking around it and acting on the backface of the upstream seat. Other proposals have also been entertained for correction of the floating seat problem, namely the valve structures set forth in U.S. Pat. Nos. 2,954,960 and 3,006,601.

As a result of the deficiencies described above, neither of the solutions set forth in the above patents has been found reasonably attractive from the standpoint of practical implementation and reliability.

SUMMARY OF THE INVENTION

It is a primary feature of the present invention to provide a novel nonfloating seat for expanding gate valves which will not cause valve binding due to gate/- seat friction and reduce the operating forces required to open the valve.

It is also a feature of this invention to provide a novel seat for expanding gate valves which establishes a seal with the valve body, which seal is enhanced in direct response to the pressure of the fluid being controlled by the valve.

It is an even further feature of this invention to provide a novel seat for expanding gate valves which is pressure balanced and therefore is not subject to pressure induced floating as is typical with other expanding gate valve seats.

It is also a feature of this invention to provide a novel seat for expanding gate valve mechanisms which is capable of compensating for slight angular misalignments of the parallel surfaces of the expanding gate.

It is an even further feature of this invention to provide a novel seat for expanding gate valve mechanisms which may be effectively utilized in existing valve bodies and which does not require major redesign of a valve body for its effective utilization.

It is another feature of this invention to provide a novel seat for expanding gate valve mechanisms which is capable of developing efficient metal-to-metal seals with both the gate mechanism and the valve body, thus maintaining the sealing effectiveness of the valve under extremely high temperatures such as during fires so that the fluid product controlled by the valve is not capable of leaking and feeding the fire.

Briefly, the present invention concerns a nonfloating seat of integral nature which is capable of being received in the seat recesses of a valve body with only minor machining modification of the seat recesses. Thus, the invention is capable of being utilized as replacement seats for existing valves as well as being used as original equipment in new valves with seat recesses that are specifically designed to receive them. The nonfloating seat of the present invention is provided in the form of a seat ring having a substantially rigid circular body portion which is enabled to be received within the large diameter portion of a seat recess formed in the valve body. The nonfloating seat also incorporates a circular axial tubular extension which is integrally formed therewith and which cooperates with the rigid portion of the seat ring to define a flow port that is disposed in registry with the flow passages of the valve. The axially extending portion of the seat ring is of smaller outer diameter as compared to the outer diameter of the rigid portion of the seat ring and is received within a smaller diameter portion of the seat recess. The tubular extension establishes a seal between an outer surface portion thereof and a cylindrical surface portion of the seat recess, thereby exposing only a small back face surface portion thereof to the pressure of the fluid being controlled by the valve. This small back face surface is substantially identical to the surface area of the seat that is exposed to fluid pressure at the front sealing face of the seat. Thus, the seat is pressure balanced and, even if loosely disposed within the seal pocket, will not be pressure actuated into high frictional contact with the sealing surface of the gate mechanism.

The tubular extension of the seat ring is sufficiently radially expandable responsive to fluid pressure that the sealing capability thereof in contact with the seat pocket wall is enhanced by pressure. Thus, as pressure increases, the sealing ability of the extension tube against the seat recess wall becomes greater and the higher the pressure, the better the seal. If desired, the tubular seat extension may be sealed by means of an elastomeric sealing member such as an O-ring seal supported in a circular seal groove defined by the extension.

In a modified form of the invention, the exposed surface area at the back face and sealing face of the seat ring can be so designed as to develop a net axial pressure induced force on the seat ring which tends to force it back into its seat recess rather than "float" it out of the seat recess. Since the seat is not allowed to float out and create a frictional drag on the segment of the expanding gate assembly while opening the valve, the problems of higher torque operation due to upstream seat frictional drag, as well as gate and segment "locking up" activity near the closed position while trying to open the valve are effectively eliminated. The valve can be opened with very little torque effort at the hand wheel with no binding problems normally encountered when such valves are being utilized in high pressure service.

Also, since the seat rings are not rigidly attached to the body structure, they can accommodate and adjust themselves to slight angular mismatches between the sealing surfaces of the gate and segment and their respective seat faces due to tolerances on the various parts and still provide an efficient seal at both the upstream and downstream seats. This is also a very important requirement for a "nonfloating" seat design to fulfill, otherwise the sealing ability of the seats will become ineffective.

One major advantage of the present invention from a practical standpoint is that the nonfloating seat rings of this invention can be adapted to existing valve body structures with very minor machining modifications in the seat pocket area. The size of the body casting or the internal cavity of the body does not need to be increased to accommodate the nonfloating seat rings. Additionally, since the present nonfloating seat design can employ a metal-to-metal seal at both the sealing face and back face, the effectiveness of the seal is maintained even in a high temperature fire environment.

BRIEF DESCRIPTION OF THE DRAWINGS

In order that the manner in which the above recited advantages and features of the invention are attained and can be understood in detail, more particular description of the invention briefly summarized above may be had by reference to the specific embodiments thereof that are illustrated in the appended drawings, which drawings form a part of this specification. It is to be understood, however, that the appended drawings illustrate only typical embodiments of this invention and therefore are not to be considered limiting of its scope, for the invention may admit to other equally effective embodiments.

In the Drawings.

DETAILED DESCRIPTION OF PREFERRED EMBODIMENTS

Figures 1, 3:
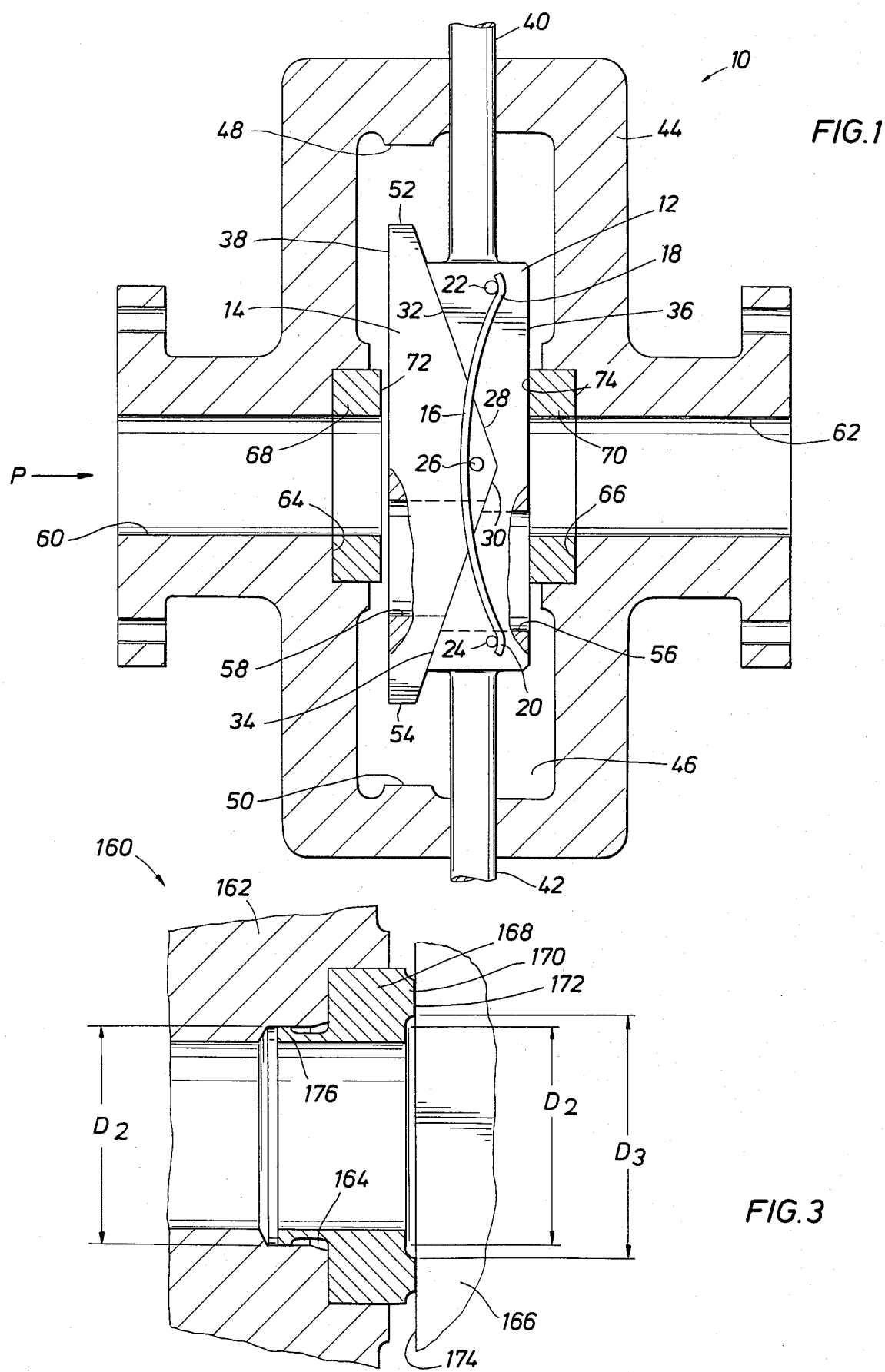
FIG. 1 is a sectional view of a parallel expanding gate valve mechanism which is representative of the prior art.
FIG. 3 is a fragmentary sectional view of the expanding gate valve mechanism of FIG. 2, illustrating a seat ring representing a modified embodiment of this invention wherein the seat ring is pressure actuated toward the seat recess.
Figure 2:
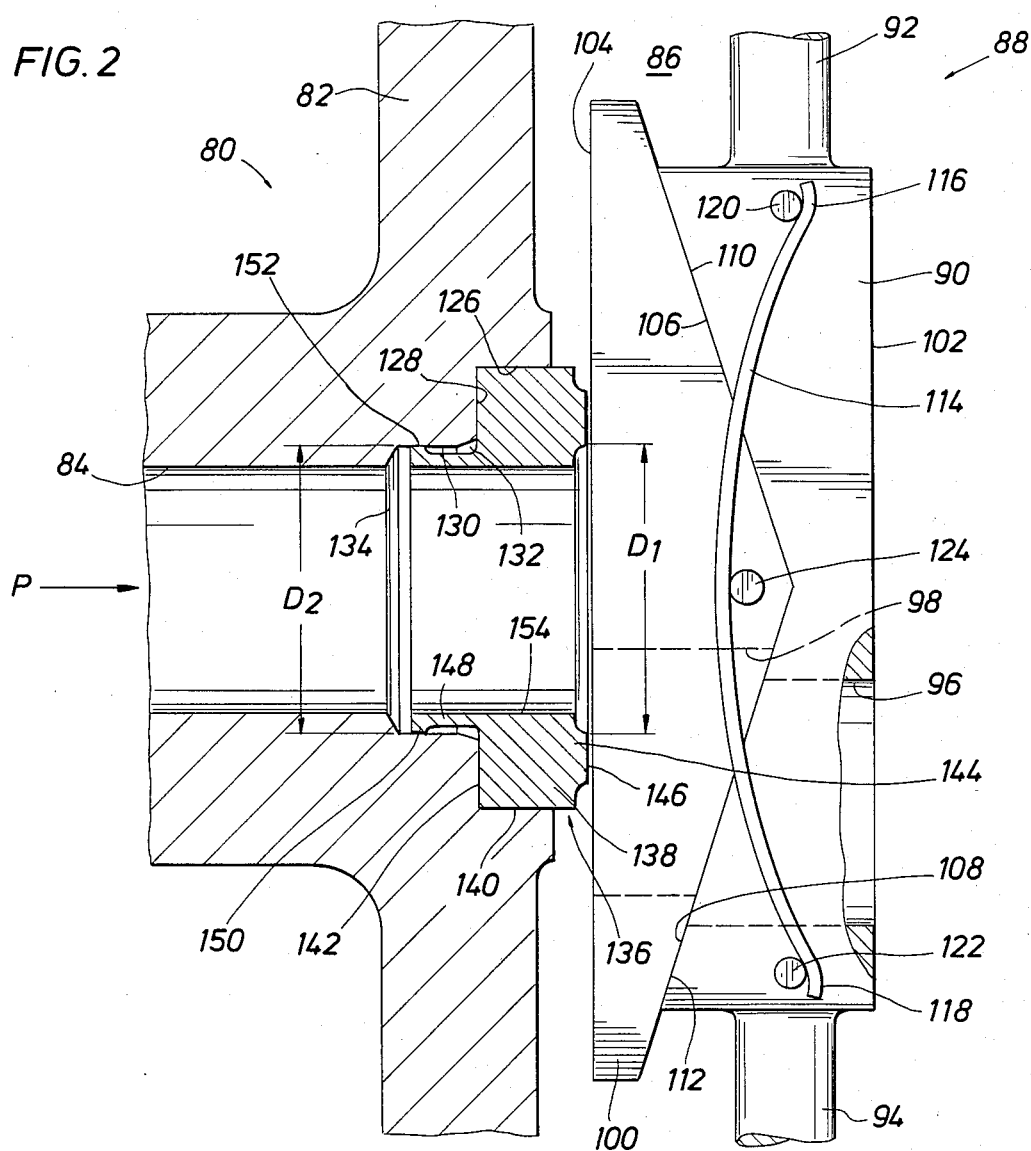
FIG. 2 is a fragmentary sectional view of a parallel expanding gate mechanism constructed in accordance with the present invention and illustrating a nonfloating seat ring of this invention being positioned within a seat recess of the valve body and with the sealing face portion thereof in engagement with the sealing surface of the segment of the expanding gate mechanism.

Referring now to the drawings and first to FIG. 2, a valve mechanism is illustrated generally at 80 which comprises a valve body structure 82 defining a flow passage 84. The valve body forms a valve chamber 86 in the same manner as discussed above in connection with FIG. 1. The only significant difference between the structure of FIG. 1 and that of the present invention is in the seat recess area of the valve body structure and the seat ring that is retained therein. The functional characteristics of the valve seats are clearly distinct from the seats of FIG. 1, however.

Within the valve chamber 86 is movably disposed an expanding gate assembly illustrated generally at 88 which incorporates a gate member 90 having an actuator stem 92 connected to the upper extremity thereof. A pressure balancing stem 94 extends from the lower extremity of the gate member 90 in the same manner as stem 42 of FIG. 1. The gate member also defines a port shown in broken line at 96 which is adapted for registry with a port 98 of a segment member 100 in the open, expanded position of the gate assembly. When open, the ports 96 and 98 are also disposed in registry with the flow passage 84 of the valve body. The gate and segment define spaced parallel sealing surfaces 102 and 104, respectively, which are adapted for sealing engagement with seat members disposed within the seat recesses of the valve body. The gate member defines angulated planar cam surfaces 106 and 108 which match the angulation of planar intersecting surfaces 110 and 112 of the segment member 100. The gate and segment assembly is shown in FIG. 2 in the collapsed position thereof with the segment resting fully within the notch defined by the intersecting cam surfaces 106 and 108. On each side of the gate and segment assembly, an arched spring wire 114 is positioned with the extremities 116 and 118 thereof in engagement with spring retainer pins 120 and 122. The central portion of the spring wire 114 is in engagement with a spring retainer pin 124. It should be borne in mind that arched spring wire elements are located on both sides of the expanding gate assembly in the manner shown.

As mentioned above, the difference in the structure shown in FIG. 1, representing the prior art, and that of the present invention lies in the internal valve body structure defining the seat recess or recesses and the annular seat ring disposed therein. As shown in FIG. 2, the seat recess defines a large diameter portion and a reduced diameter portion. The large diameter portion is formed by a generally cylindrical surface 126 which intersects a radial, planar surface 128. The reduced diameter portion of the seat recess is contiguous with the large diameter portion and is defined in major portion by a cylindrical surface 130 which functions as a sealing surface. Tapered surfaces 132 and 134 are transition surfaces respectively interconnecting the major seat recess with the reduced diameter recess and the reduced diameter recess with the flow passage 84. Surfaces 132 and 134 may be of other configuration without departing from the spirit and scope of the present invention and without modifying the function of the seat ring.

Within the seat recess is positioned an annular seat ring shown generally at 136 having a substantially rigid ring portion 138 defining a generally cylindrical outer peripheral surface 140 engaging the cylindrical surface 126 of the seat recess and a planar radial surface 142 which is adapted to be positioned in juxtaposed relation with the planar surface 128 of the seat recess. At the face portion of the seat ring 138 is formed an annular sealing ridge 144 which defines an annular planar sealing surface 146 that is disposed for sealing engagement with the sealing surface 104 of the segment member 100.

The seat member 136 is also formed to define an axially projecting tubular portion 148 which may be integrally formed with the seat as shown or may be a separate piece connected to the seat ring. The tubular portion extends into the reduced diameter portion of the seat recess in close proximity to the cylindrical sealing surface 130. The tubular portion 148 is formed to define a radially projecting sealing lip 150 which forms a cylindrical sealing surface 152. The sealing surface 152 is of slightly greater initial dimension as compared to the dimension of the cylindrical sealing surface 130 prior to insertion of the seat member into the seat recess. As the seat member is inserted the cylindrical sealing surface 152 establishes an interference fit with the sealing surface 130, thereby providing a metal-to-metal seal at the back face portion of the seat ring.

Although composed of a hard material such as hardened steel, the axially projecting tubular portion 148 of the seat ring is flexible to some degree. As the pressure of the fluid controlled by the valve increases, this pressure will act upon the internal diameter of the tubular portion 148 by virtue of the port 154 defined within the seat ring. The pressure will therefore induce a force on the tubular portion 148 of the seat tending to expand it radially, thus urging the cylindrical surface 152 of the sealing lip 150 more tightly into sealing engagement with the cylindrical surface 130 of the seat recess. Thus a pressure actuated sealing capability is developed which enhances the seal established between surfaces 130 and 152 in direct response to the pressure condition of the valve. The favorable result is as pressure increases, the sealing capability of the seat ring also increases.

As mentioned above in connection with FIG. 1, it is desirable that the seat ring remain fully seated within its seat recess so that the front sealing face of the seat ring does not maintain frictional engagement with the sealing surface of the segment after the gate and segment assembly has collapsed to the position shown in FIG. 1. With the seat ring in sealing engagement with the segment and with gate collapsing movement initiated, it is possible at times for pressure to enter the upstream seat recess behind the seat ring. When this occurs, a pressure responsive area differential will exist. Pressure will act upon the entire back face of the seat ring while sealing contact between the seat ring and segment reduces the pressure responsive area at the sealing face of the seat ring. This undesirable condition causes seat drag against the segment and can cause wedge locking of the gate assembly. To overcome any possibility of pressure responsive floating of the seat ring, the seat ring of this invention has been designed to be pressure balanced when in contact with the sealing surface of the segment member. As shown in FIG. 2, contact between the sealing surface 146 of the seat ring and the sealing surface of the gate establishes a pressure responsive area $D_1$ at the face portion of the seat. Likewise, the seal established between cylindrical surfaces 130 and 152 at the rear portion of the seat defines a pressure responsive area $D_2$. Pressure responsive areas $D_1$ and $D_2$ of the seat ring are substantially identical, thereby developing a net pressure responsive force of substantially zero. Even under circumstances where the seat ring 136 is fairly loosely retained within the seat recess, it will have no pressure responsive tendency to float toward the segment member when the segment is collapsed toward the gate portion of the expanding gate assembly. Further, if the seat ring 136 is loosely retained within the seat recess, as soon as the seal between the seat ring and segment is borken, the entire sealing face portion of the seat ring will be exposed to the pressure condition while the rear face portion of the seat ring is restricted to the surface area $D_2$ by the seal between surfaces 130 and 152. This pressure responsive area differential therefore develops a resultant force tending to drive the seat ring into fully seated relation within the seat recess.

It may also be desirable to provide a seat construction of the nature shown in FIG. 2 wherein the seat ring is retained within its seat recess by means of a pressure responsive force differential. If such is desired, a valve mechanism may take the form shown generally at 160 in FIG. 3. The valve body structure 162 and its seat recess 164 are of the same configuration as set forth in FIG. 2. An expanding gate member 166 incorporating a gate and segment is also of the same configuration as shown in FIGS. 1 and 2. A seat ring 168 is provided which differs from the seat ring 136 of FIG. 2 only in the position and dimension of the face sealing surface thereof. As shown in FIG. 3, the seat ring 168 defines a circular sealing projection 170 defining a circular planar sealing surface 172 which is positioned for sealing engagement with a planar sealing surface 174 of the segment portion of the gate and segment assembly 166. At the back face portion of the seat ring 168 the tubular extension portion 176 is of identical size and configuration as shown in FIG. 2 thereby establishing a back face area $D_2$ of the same dimension as in FIG. 2. The inner and outer peripheral edges of the sealing surface 172 are of greater diameter as compared to the sealing surface 146 of FIG. 2, thereby establishing a face sealing area $D_3$ which is greater than the back face pressure responsive area $D_2$. An area differential is therefore defined which is greater at the face portion of the seat ring 168 than at the back face portion thereof. Pressure acting against this area differential will develop a resultant force acting on the seat ring 168 which urges the seat ring toward the seat recess. By controlling the dimension of the internal diameter $D_3$ of the face sealing surface 172 in comparison to diameter $D_2$ at the rear face portion of the seat ring, a resultant force of desired character will be developed throughout the pressure range of the valve. The tendency at all pressures, however, will be the development of a resultant force tending to maintain the seat ring 168 within the seat recess. There will be no tendency therefore for the seat ring to float outwardly from the seat recess as the gate and segment assembly 166 becomes collapsed.

It is also desirable that an expanding gate valve have the capability of compensating for slight angular misalignment of the sealing surfaces of the expanding gate mechanism. In accordance with the present invention, the seat rings 136 and 168 of FIGS. 2 and 3 are capable of compensating for such slight angular misalignment and yet maintaining an effective seal with the expanding gate mechanism. The major seat retaining surfaces 126 and 128 as shown in FIG. 2 are so dimensioned relative to corresponding surfaces 140 and 142 of the seat ring 136 such that the seat ring will seek optimum seating relation within the seat recess as controlled by the respective sealing surface 104 or 102 of the gate and segment assembly. As the gate assembly expands, the sealing surfaces thereof will be forced into tight wedging engagement with the sealing surfaces 146 of the seat ring. Since the seat rings are not rigidly attached to the body structure of the valve, they can become slightly canted or angularly misaligned with respect to the axis of the respective seat recess. The sealing surfaces 146 thereof will therefore establish optimum sealing engagement with the respective sealing surfaces 102 and 104 of the expanding gate assembly. The seats can therefore accommodate and adjust themselves to slight angular misalignment of the sealing surface of the gate due to the tolerances on the various parts even though an optimum seal is effectively maintained between the sealing lip of the tubular projection and cylindrical rear wall of the seat recess.

One of the major advantages of the present invention from a practical standpoint is that existing valve bodies may be modified by simple machining to convert the seat recesses of the valve bodies from the configuration shown in FIG. 1 to the configuration shown in FIGS. 2 and 3. The strength and pressure containing capability of the valve body will not in any way be diminished due to such machining. The size of the body casting or the internal cavity of the body casting does not need to be increased. Valves being overhauled therefore can be provided with nonfloating seats according to the present invention thereby effectively eliminating any problems of wedge locking. Additionally, since the seat ring 136 is composed entirely of metal and is seated against the metal surfaces of the valve body and expanding gate assembly, the valve mechanism is capable of maintaining an effective seal even at abnormally high temperature conditions such as might occur in the case of a fire. The seat rings therefore render the valve fire safe to a greater degree than would be the case if O-rings or plastic materials were utilized to enhance the sealing capability thereof.

Figure 4:
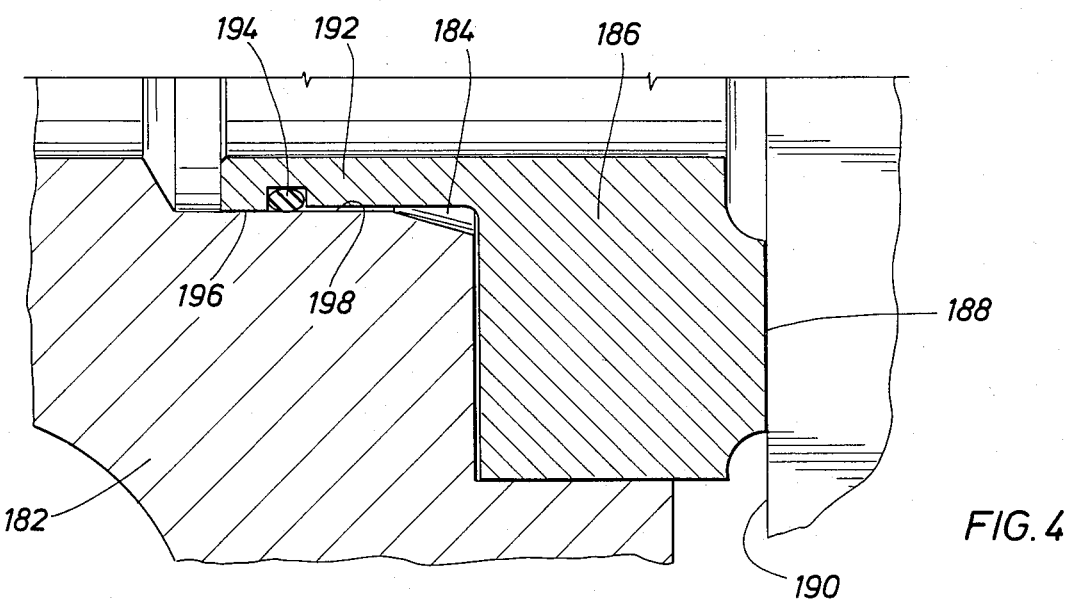
FIG. 4 is a fragmentary sectional view of an expanding gate valve mechanism similar to that of FIG. 2 and being provided with rear sealing capability by means of an elastomeric sealing member.

Although metal-to-metal sealing capability is illustrated in the nonfloating seats of FIGS. 2 and 3, it may desirable to provide an elastomeric sealing capability in lieu thereof or in addition thereto. As illustrated in FIG. 4 a valve mechanism is illustrated generally at 180 in the fragmentary sectional incorporating a valve body structure 182 defining one or more seat recesses 184 which may be essentially identical as compared to the seat recesses shown in FIGS. 2 and 3. A seat ring 186 is received within the seat recess and defines a face sealing surface 188 disposed for sealing engagement with sealing surface 190 of the segment portion of a gate and segment assembly. The seat ring also defines an elongated tubular extension 192 having an outer peripheral seal groove formed therein and retaining an annular sealing element 194 such as an elastomeric O-ring type sealing member. The tubular extension may be integrally formed with the seat ring or a separate piece interconnected with the seat ring in any suitable manner. The tubular extension of the seat ring may be loosely fitted within the seat recess if desired or, in the alternative, may define an annular radially projecting sealing lip 196 disposed in metal-to-metal interference sealing relation with the the cylindrical surface 198 of the seat recess. The seat of FIG. 4 may be pressure balanced in the manner illustrated in FIG. 2, or, in the alternative, may be pressure energized in the manner set forth in conjunction with FIG. 3.

In view of the foregoing, it is respectfully submitted that the valve mechanism of the present invention is capable of accomplishing all of the features hereinabove set forth together with other features which are inherent from a description of the apparatus itself. It will be understood that certain combinations and subcombinations are of utility and may be employed without reference to other features and subcombinations. The scope of this invention is intended to be limited only by the scope of the appended claims and is not limited by the specific embodiments shown and described herein.

What is claimed is:

1. A nonfloating seat for expanding gate valves having a valve body defining an upstream seat recess, said seat comprising:
   (a) a seat ring body of rigid character for interference retention within the upstream seat recess of said valve body;
   (b) a sealing face of circular form being defined by said seat ring body and being disposed for sealing engagement with the segment portion of an expanding gate and segment assembly;
   (c) an axial extension tube extending from said seat ring body and having an outer periphery of small dimension as compared to the dimension of the outer periphery of said seat ring body, said seat ring body and said axial extension tube cooperatively defining a flow port in fluid registry with the flow passage of said valve body; and
   (d) a radial sealing lip being formed on the outer peripheral portion of said axial extension tube, said radial sealing lip establishing an interference seal with said valve body.

2. A nonfloating seat as recited in claim 1, wherein: said extension tube is yieldable radially under the influence of fluid pressure, said interference seal being enhanced responsive to increase in said fluid pressure.

3. A nonfloating seat as recited in claim 1, wherein: the position of said seat within its seat recess is sufficiently adjustable as to compensate for slight angular misalignment of the sealing surfaces of the gate assembly.

4. A nonfloating seat as recited in claim 1, wherein: said sealing face and said extension tube defines substantially equal pressure responsive areas causing said seat to be substantially pressure balanced.

5. A nonfloating seat as recited in claim 4, wherein: said sealing face is of greater internal diameter as compared to the internal diameter of said seat ring body and is of smaller outer diameter as compared to the outer diameter of said seat ring body.

6. A nonfloating seat as recited in claim 5, wherein: the outer diameter of said extension tube and the inner diameter of said sealing face are substantially equal.

7. A nonfloating seat as recited in claim 1, wherein: said sealing face and said extension tube define pressure responsive areas, said pressure responsive area of said sealing face being greater than said pressure responsive area of said extension tube causing said seat to be urged responsive to pressure in a direction toward the seat recess and away from said gate.

8. A nonfloating seat as recited in claim 1, including: an elastomeric sealing member establishing said seal between said tubular extension and said valve body.

9. An expanding gate valve having nonfloating seats, comprising:
   (a) a valve body defining an internal valve chamber and flow passages intersecting said valve chamber, said valve body defining upstream seat recess means having a large diameter portion and a small diameter portion;
   (b) a gate and segment assembly being lineraly movable within said valve chamber and defining opposed planar sealing surface means being expandable and contractable by relative linear movement of the gate and segment;
   (c) a rigid seat ring body positioned in immovable interference fitting relation within said large diameter portion of said seat recess means;
   (d) a circular sealing face being defined by said seat ring body and being disposed for sealing engagement with the planar sealing surface of said segment;
   (e) an axial extension tube projecting upstream from said seat ring body and having an outer periphery of small dimension as compared to the dimension of the outer periphery of said seat ring body; and
   (f) a radial sealing surface being formed on the outer peripheral portion of said extension tube, said radial sealing surface establishing a metal-to-metal interference seal with said small diameter portion of said seat recess means.

10. An expanding gate valve as recited in claim 9, wherein: said extension tube is yieldable radially under the influence of fluid pressure, said metal-to-metal interference seal being enhanced responsive to increase in said fluid pressure.

11. An expanding gate valve as recited in claim 9, wherein: said extension tube is sufficiently flexible to compensate for slight angular misalignment of the sealing surface of the gate assembly.

12. An expanding gate valve as recited in claim 9, wherein: said sealing face and said extension tube define substantially equal pressure responsive areas causing said seat to be substantially pressure balanced.

13. An expanding gate valve as recited in claim 12, wherein: said sealing face is of greater internal diameter as compared to the internal diameter of said seat ring body and is of smaller outer diameter as compared to the outer diameter of said seat ring body.

14. An expanding gate valve as recited in claim 13, wherein: the outer diameter of said extension tube and the inner diameter of said sealing face are substantially equal.

15. An expanding gate valve as recited in claim 9, wherein: said sealing face and said extension tube defines pressure responsive areas, said pressure responsive area of said sealing face being greater than said pressure responsive area of said extension tube causing said seat to be urged responsive to pressure in a direction toward the seat recess and away from said gate.

16. An expanding gate valve as recited in claim 9, wherein:
a circular sealing member also establishes a said seal between said tubular extension and said valve body.

17. An expanding gate valve as recited in claim 16, wherein:
(a) said tubular extension forms an external peripheral seal groove at said radial sealing surface; and
(b) said circular sealing member is retained within said external peripheral seal groove and establishes sealing engagement with said small diameter portion of said seat recess means.

18. An expanding gate valve as recited in claim 9, wherein:
said radial sealing surface is defined by a circular radially outwardly extending portion of said extension tube.

19. An expanding gate valve comprising:
(a) a valve body defining an internal valve chamber and flow passages intersecting said valve chambers, said valve body further defining circular seat recesses about said flow passages, said circular seat recesses each defining first cylindrical surface means and second cylindrical surface means being of small diameter as compared to said first cylindrical surface means;
(b) a gate and segment assembly being linearly movable within said valve chamber and defining opposed planar sealing surfaces being expandable and contractable by relative linear movement of said gate and segment;
(c) seat rings being positioned within said seat recesses and defining a circular face seal disposed for sealing contact with said gate and segment assembly and a circular back face seal in sealing contact with said valve body within the respective one of said seat recesses, the defined area of said face seal exposed to pressure being greater than the defined area of said back face seal exposed to pressure developing a pressure induced net resultant force acting on said seat ring in a direction toward said back face; and
(d) at least the upstream one of said seat rings comprising:
(1) a rigid seat ring body forming a peripheral cylindrical surface positioned in juxtaposition with said first cylindrical surface of said seat recess;
(2) a sealing face of circular planar form being defined by said rigid seat ring body and positioned for engagement with said planar sealing surface of said segment; and
(3) a flexible extension tube extending axially from said rigid seat ring body and forming a cylindrical radial sealing surface having metal-to-metal interference sealing engagement with said second cylindrical surface to form said back face seal, said flexible extension tube being radially expanded responsive to pressure to enhance said metal-to-metal interference sealing engagement.

20. An expanding gate valve as recited in claim 19, wherein:
(a) said flexible extension tube defines a circular seal groove at said cylindrical radial sealing surface; and
(b) a circular sealing element is positioned within said circular seal groove and establishes sealing between said flexible extension tube and said second cylindrical surface of said seat recess.

21. An expanding gate valve as recited in claim 20, wherein:
a radially outwardly projecting lip is formed at the free extremity of said flexible extension tube and defines said cylindrical radial sealing surface.

* * * * *